United States Patent [19]

Gutleber

[11] 4,457,007
[45] Jun. 26, 1984

[54] MULTIPATH INTERFERENCE REDUCTION SYSTEM

[75] Inventor: Frank S. Gutleber, Little Silver, N.J.

[73] Assignee: The United States of America as represented by the Secretary of the Army, Washington, D.C.

[21] Appl. No.: 445,333

[22] Filed: Nov. 29, 1982

[51] Int. Cl.³ .............................................. H04B 1/12
[52] U.S. Cl. ...................................... 375/102; 455/65; 455/304; 328/165
[58] Field of Search .................. 375/102, 104; 455/65, 455/303–306; 328/165

[56] References Cited

U.S. PATENT DOCUMENTS

| 3,908,088 | 9/1975 | Gutleber | 370/104 |
| 3,978,415 | 8/1976 | DeFord | 328/165 |
| 4,215,244 | 7/1980 | Gutleber | 370/116 |
| 4,301,530 | 11/1981 | Gutleber | 370/18 |

FOREIGN PATENT DOCUMENTS 45-11761 4/1970 Japan ................................. 328/165

0573864 10/1977 U.S.S.R. .............................. 328/165

OTHER PUBLICATIONS

Weik, Martin H., *Communications Standard Dictionary*, Van Nostrand Reinhold Company, 1983, pp. 56, 200.

Primary Examiner—Robert L. Griffin
Assistant Examiner—Albert W. Watkins
Attorney, Agent, or Firm—Anthony T. Lane; Sheldon Kannes; Jeremiah G. Murray

[57] ABSTRACT

A multipath interference reduction system for mobile subscriber access systems, each occupying one of a plurality of time slot channels. Interference caused by multipath returns is eliminated in the receiver portion of digital signal communications apparatus by a plurality of cascaded signal subtraction units wherein the detected signal is successively delayed by increasing multiples of the pulsewidth of the main lobe, varied in amplitude and subtracted from itself until all the multipath amplitudes of significance are subtracted out of the composite received signal.

6 Claims, 7 Drawing Figures

MULTIPATH INTERFERENCE REDUCTION SYSTEM

The invention described herein may be manufactured, used and licensed by or for the Government for governmental purposes without the payment to me of any royalties thereon.

FIELD OF THE INVENTION

This invention relates to mobile communications systems and more particularly to a multipath interference reduction system for a mobile subscriber accessing system.

BACKGROUND OF THE INVENTION

As is well known and understood, in a mobile subscriber access system, it is desirable to utilize time division multiple access for orthogonal (mutually non-interfering) signalling or message traffic or to employ a large number of time slots in a non-orthogonal pulse address multiple access system. A typical example of a time division multiple access communications system is shown and described in U.S. Pat. No. 4,301,530, entitled, "Orthogonal Spread Spectrum Time Division Multiple Accessing Mobile Subscriber Access System", which issued to Frank S. Gutleber, the present inventor, on Nov. 17, 1981. Other examples include U.S. Pat. No. 3,908,088, entitled, "Time Division Multiple Access Communications System" which issued to Frank S. Gutleber on Sept. 23, 1975; and U.S. Pat. No. 4,215,244, entitled, "Self-Adaptive Mobile Subscriber Access System Employing Time Division Multiple Accessing", which issued to Frank S. Gutleber on July 29, 1980. While these systems purportedly operate as intended, the effectiveness of these systems is minimized due to interference caused by multipath returns. This is particularly true where digital pulses are transmitted and received in assigned time slots or channels and wherein multipath returns in effect stretch the composite pulse of the received signal, causing a spillover into one or more adjacent time slots, making them either unavailable for use or at least substantially reduced in performance.

SUMMARY OF THE INVENTION

Accordingly, it is an object of the present invention to provide an improvement in multiple access communications systems.

Another object of the present invention is to provide an improvement in mobile subscriber access communications systems utilizing a plurality of time slot channels.

Still another object of the invention is to provide an improvement in mobile subscriber access systems wherein interference caused by multipath returns is substantially reduced.

Accordingly, these and other objects are achieved in accordance with a mobile subscriber access system, including a plurality of users, each utilizing pulse type radio communication apparatus having a receiver portion which includes means for detecting a composite signal consisting of the main lobe or original pulse signal and any multipath returns which also occur following the original pulse signal. The detected composite signal is fed to a plurality of cascaded subtraction circuit sections or units where the respective signals are delayed, varied in amplitude and subtracted from itself. The delay imposed increases by one pulsewidth of the main lobe for each succeeding subtraction unit whereby substantially all of the multipath amplitudes are subtracted out of the composite signal while leaving the desired signal free of multipath interference.

DETAILED DESCRIPTION OF THE PREFERRED EMBODIMENTS

Figure 1:
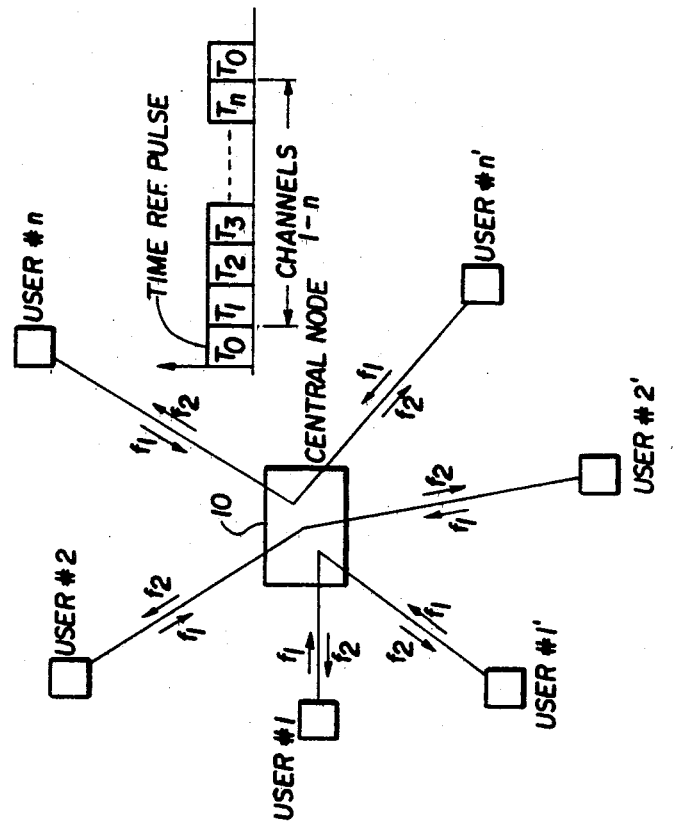
FIG. 1 is a simplified illustration of a mobile subscriber access system utilizing time division multiple access between a plurality of users.

Referring now to the drawings and more particularly to FIG. 1, there is illustrated a pulse type multiple access communications system such as a mobile subscriber access system employing time division multiple access between a plurality of users 1 through n' wherein one user, for example, #1 communicates to another user #1' in one assigned time slot $T_1$ of n time slot channels. Other sets or pairs of users communicate with each other in respective other assigned time slot of the time slots $T_2$ through $T_n$. Such a system is shown and described in the above referenced U.S. Pat. No. 4,301,530. Further as shown in FIG. 1, the users 1 through n communicate with each other through a central node or station 10 wherein time synchronism between all the users in the system is provided by a loopback synchronous timing scheme so that pulse coded signals being communicated between the users arrive at the central station 10 at the same time in order to obtain a common time reference for all the users accessing the system. Although not essential for system operation, it is desirable that all transmission from the various users in the central node be made in one frequency band $F_1$ and those from the central node to users be made in a different frequency band $F_2$. This makes the users receptive only to transmission from the central node 10 which then provides a space time reference for all the users, Nos. 1 through n', with the various accessing signals being synchronously locked to a common time reference.

Accordingly, the communications system as shown in FIG. 1 is adapted to operate with RF pulse communication signals comprised of a coded or uncoded pulse or pulse group. The present invention lies in the receiver portion of each user communications apparatus of the system shown in FIG. 1 and has for its purpose the minimization of interference caused by multipath returns of pulse signals to the respective users from the central node 10. The multipath interference is reduced by a series of successive signal subtractions wherein video signal pulses consisting of the main lobe or original pulse and any multipath returns which appear subsequently in time thereto are delayed, varied in amplitude and subtracted from itself with the delay increasing by one pulsewidth for each succeeding subtraction step until substantially all of the multipath amplitudes of significance are eliminated, while providing the desired signal.

Figure 2:
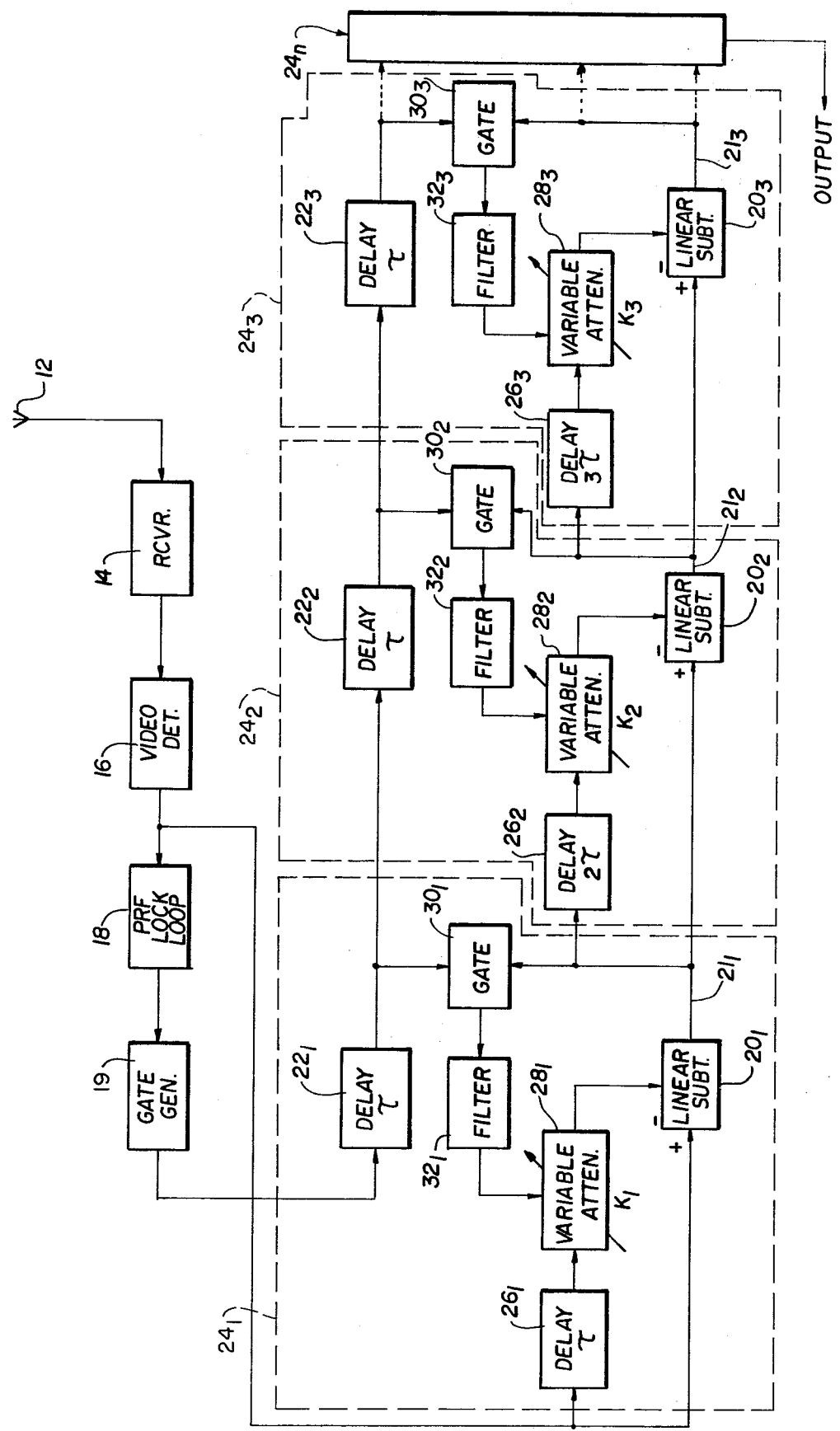
FIG. 2 is a functional block diagram illustrative of the preferred embodiment of the subject invention.

Referring now to FIG. 2, reference numeral 12 denotes an antenna 12 coupled to a communications receiver 14. The output of the receiver is video detected at 16 and coupled to a PRF lock loop 18 as well as the first of a plurality of cascaded linear signal subtractors $20_1$, $20_2$, $20_3$ ... $20_n$ where the output of each subtractor appearing on signal lines $21_1$, $21_2$, etc. connects to one input of the following subtractor. The PRF lock loop 18 is locked to the front edge of the detected composite signal which may be a pulse train consisting of a coded pulse group or an uncoded pulse. The PRF lock loop 18 is coupled to a gate generator 20 which provides a synchronized gate signal that is applied to the first of a plurality of time delay circuit means $22_1$, $22_2$, $22_3$, $22_n$, each providing a time delay $\tau$ which is equal to the pulsewidth of the detected video signal of the main lobe or original pulse transmitted.

Each linear subtractor $20_1$, $20_2$, $20_3$, ... $20_n$ comprises one element of a plurality of subtraction units $24_1$, $24_2$, $24_3$ and $24_n$ which further includes a respective time delay circuit $26_1$, $26_2$, $26_3$ and $26_n$ coupled to a variable attenuator $28_1$, $28_2$, $28_3$ ... $28_n$. The attenuation is controlled in accordance with the amplitude of a selected one, i.e. the first multipath pulse signal appearing at the output of the respective linear subtractors $20_1$, $20_2$, $20_3$ ... $20_n$. This is accomplished by means of a gated feedback signal path including gates $30_1$, $30_2$, $30_3$ ... $30_n$ which are enabled following the appearance of the main pulse appearing in the output of each linear subtractor. Since the time delay means $22_1$, $22_2$, $22_3$ ... $22_n$ provides a delay equal to the pulsewidth of the main pulse, the gate signal output from the gate generator 19 when delayed by each of the delay circuits $22_1$, $22_2$, $22_3$ ... $22_n$ will enable the gates $30_1$, $30_2$, $30_3$ ... $30_n$ at the proper time, causing the attenuators $28_1$, $28_2$, $28_3$ ... $28_n$ to change the signal input to the attenuators in a predetermined direction to cause the amplitude of the respective delayed main pulse to equal the amplitude of the first remaining multipath return pulse. In order to provide a well defined control signal to the variable attenuators, filter means $32_1$, $32_2$, $32_3$ ... $32_n$ are shown in FIG. 2 coupled between the respective gates and attenuators.

Figure 3A:
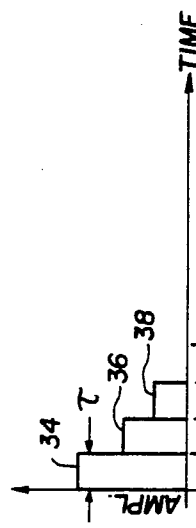
FIGS. 3A through 3E are a set of time waveforms illustrative of the operation of the subject invention.

Operation of the interference reduction system as shown in FIG. 2 will become evident when considered in conjunction with the waveforms illustrated in FIGS. 3A through 3E. The composite output of the video detector 16 is shown in FIG. 3A being comprised of the main lobe 34 of pulsewidth $\tau$ accompanied by two successive multipath return pulses 36 and 38 of relatively lesser amplitude. This composite video signal is simultaneously fed to the (+) input of the first linear subtractor $20_1$ of FIG. 2, as well as the first delay circuit $26_1$ of the subtractor unit $24_1$. The delay circuit $26_1$ is operable to delay the composite signal by the pulsewidth $\tau$ of the desired signal where it is fed to the negative (−) input of the linear subtractor $20_1$ after being attenuated by an attenuation factor $K_1$ by the variable attenuator $28_1$. The delayed and attenuated composite pulse signal applied to the (−) input corresponds to the pulses as shown by reference numerals 34', 36' and 38' in FIG. 3A.

Figure 3B:
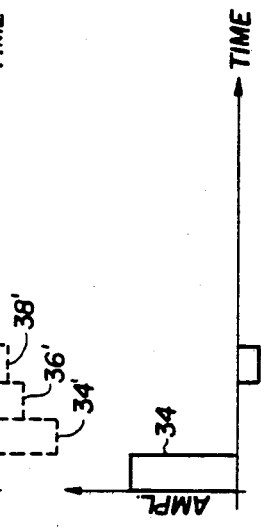

If the amplitude of the delayed main pulse 34' is equal to the amplitude of the first multipath pulse 36 and the delayed first multipath pulse 36' equal to the second undelayed multipath pulse 38, the output of the linear subtractor $20_1$ will appear as shown in FIG. 3B comprised only of the main lobe 34 and the second delayed multipath pulse 38' which is inverted. As shown in FIG. 2, the gain or attenuation factor $K_1$ of the variable attenuator $28_1$ is controlled by the linear subtractor output signal passing through the gate $30_1$. Since the gate $30_1$ is enabled by a gate signal having a delay $\tau$ provided by the time delay means $22_1$, it is enabled immediately following the video pulse of the main lobe 34. Accordingly, the gain of the variable attenuator $28_1$ will be set in accordance with the amplitude of the multipath pulse 36, which by proper design automatically adjusts itself in accordance with the principle of negative feedback until the voltage level of the pulse 36 in the output of the linear subtractor $20_1$ is reduced to zero as shown in FIG. 3B.

In the example illustrated, the second multipath return 38 is also reduced to zero by the first delayed multipath return 36 in the first subtractor unit $24_1$. The second subtractor unit $24_2$ would, therefore, reduce the amplitude of the delayed signal from the delay unit $26_2$ to zero with the variable attenuator $28_2$.

Figure 3C:
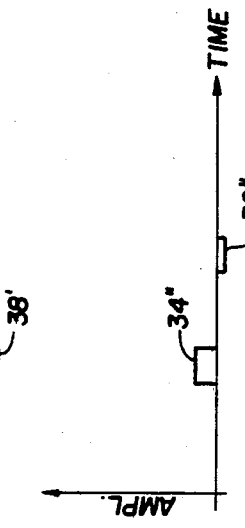
Figure 3D:
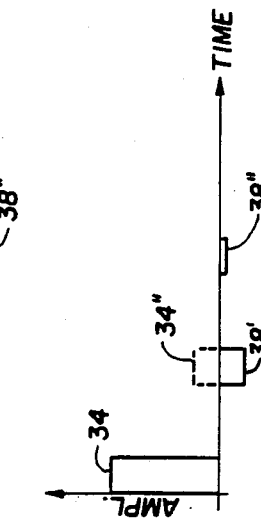
Figure 3E:
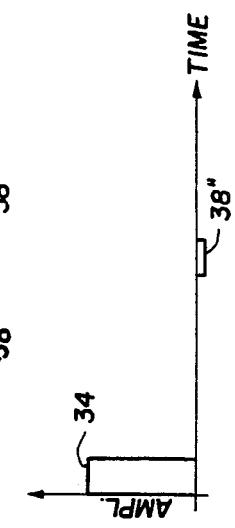

The output of the second linear subtractor $20_2$ is then fed in pipeline fashion to the positive (+) input of the third linear subtractor $20_3$ as well as the delay circuit $26_3$ which is adapted to provide a delay of three times the pulsewidth of the main pulse or $3\tau$ as shown by the waveforms 34'' and 38'' of FIG. 3C. Further, the pulses 34'' and 38'' comprise the main pulse and second multipath pulse which have been attenuated by the variable attenuator $28_3$. Applying the pulses 34'' and 38'' to the negative (−) input of the linear subtractor $20_3$ along with the output of the second linear subtractor $20_2$, namely pulses 34 and 38' as shown in FIG. 3D, the output of the linear subtractor $20_3$ will be comprised of the main lobe 34 and a residual second multipath pulse 38''' of a substantially reduced amplitude as shown in FIG. 3E. A further reduction will be provided in the same manner for the fourth through nth subtraction units.

Thus by successively delaying the respective outputs of the linear subtractors by one pulsewidth for each succeeding subtraction unit, all of the multipath amplitudes will be subtracted out with the exception that some residue will be left following the nth linear subtractor $20_n$; however, this amplitude will be negligible. Accordingly, with all of the attenuators $28_1$, $28_2$, $28_n$ appropriately controlled, the final output signal which corresponds to the desired pulse signal will be essentially free of the undesired multipath returns and this includes all of the input pulses from various different users when separate interfering pulse trains possess the same multipath characteristics. This is particularly true for a system such as shown in FIG. 1 for the transmission paths from the central station to the mobile users.

While multipath interference reduction is obtained at the expense of a small decrease in the received output signal to noise ratio, the corresponding reduction in transmission efficiency will be justified when this type of interference represents the primary performance criteria as it would in mobile access communications systems of the type described. It should be noted, moreover, that the signal to noise degradation will not in general be large since the added uncorrelated noise at the various subtractors will be largely attenuated.

In applications where the separate received pulse signal channels have different multipath characteristics, when desired, separate multipath cancellers can be utilized for each individual channel characteristic. To achieve this, each input pulse train, for example, that threatens to interfere with the time slot being used by another specific user in a different channel would be separately gated out and its own multipath returns cancelled substantially as shown and described with respect to the embodiment of the invention as shown in FIG. 2.

Having thus shown and described what is at present considered to be the preferred embodiment of the invention, all modifications, alterations and changes coming within the spirit and scope of the invention as set forth in the appended claims are herein meant to be included.

I claim:

1. A system for reducing multipath return interference in a multiple user communication system comprising:

a plurality of user communications apparatus, one for each user, being operable to communicate with each other in respective time slots of a plurality of mutually adjacent time slot channels;

each said communications apparatus including means for receiving and detecting pulse type signals including a desired signal and any multipath return signals and providing pulse type video signals thereof having respective amplitudes and pulsewidths, and a plurality of cascaded signal subtractor units each comprised of signal combiner means having a pair of inputs and being operable to provide a difference signal at an output in response to respective input signals applied to said pair of inputs, time delay means providing a time delay equal to the multiple of the pulsewidth of the detected desired video signal and varible gain signal coupling means coupling said time delay means to one of said pair of inputs, and means responsive to the amplitude of the detected multipath return video signal coupled to and controlling the gain of signal coupling means, said multiple of the pulsewidth increasing in discrete numerical steps beginning with the first of said plurality of subtractor units to the last, and means coupling detected video signals in sequence first from said detector means and then from said output of the preceding signal combiner means to the other of said pair of inputs of said combiner means and said time delay means in synchronism, whereby video signals sequentially applied to each subtractor unit are selectively delayed, varied in amplitude and subtracted from the same respective undelayed video signals, causing the multipath return signals to be selectively cancelled while providing an output of the desired signal.

2. The system as defined by claim 1 wherein the video signal of said desired signal substantially occupies one of said plurality of time slots and the video signals of said multipath return signals occupy respective adjacent time slots of said plurality of time slots.

3. The system as defined by claim 2 wherein said means controlling the gain of said signal coupling means comprises a gated signal path from said output of the respective signal combiner means to said variable gain signal coupling means.

4. The system as defined by claim 1 and additionally including means for enabling said gated signal path of each subtractor unit after a time delay equal to the same multiple of the detected desired video signal as provided by the respective time delay means thereof.

5. The system as defined by claim 4 wherein said variable gain signal coupling means of each said signal subtractor units comprises variable attenuator means.

6. The system as defined by claim 4 wherein said signal combiner means of each said signal subtractor units comprises signal subtractor means.

* * * * *